United States Patent [19]
DeMaster et al.

[11] Patent Number: 5,841,613
[45] Date of Patent: Nov. 24, 1998

[54] TAPE CASSETTE FOR CLEANING VCR HEADS AND TRANSPORT COMPONENTS

[75] Inventors: Robert D. DeMaster, Afton; Alexander R. Mitka, Roseville; John V. Nowicki, Oakdale, all of Minn.; Alexander S. Sinclair, Twickenham, England; Richard E. Skare, Stillwater; Mark W. Weavers, Little Canada, both of Minn.

[73] Assignee: Minnesota Mining and Manufacturing Company, St. Paul, Minn.

[21] Appl. No.: 295,225

[22] Filed: Aug. 24, 1994

Related U.S. Application Data

[63] Continuation of Ser. No. 35,744, Mar. 23, 1993, abandoned.

[51] Int. Cl.⁶ .................................................. G11B 5/10
[52] U.S. Cl. .................................................. 360/128
[58] Field of Search ....................... 360/128, 137, 360/132

[56] References Cited

U.S. PATENT DOCUMENTS

| | | | |
|---|---|---|---|
| 3,823,947 | 7/1974 | Sasaki et al. | 274/11 E |
| 3,978,520 | 8/1976 | Nowicki et al. | 358/10 |
| 4,091,168 | 5/1978 | Kawamata | 360/85 |
| 4,408,241 | 10/1983 | Ogawa | 360/128 |
| 4,516,176 | 5/1985 | Street | 360/75 |
| 4,607,297 | 8/1986 | Sonoda et al. | 360/55 |
| 4,616,274 | 10/1986 | Nagaoka | 360/132 |
| 4,616,283 | 10/1986 | Clausen et al. | 360/55 |
| 4,724,484 | 2/1988 | Ward | 358/139 |
| 4,773,920 | 9/1988 | Chasman et al. | 51/295 |
| 4,778,714 | 10/1988 | Woolley et al. | 428/217 |
| 4,893,209 | 1/1990 | Siddiq | 360/128 |
| 4,928,189 | 5/1990 | Siddiq | 360/128 |
| 4,941,065 | 7/1990 | Fritsch | 360/128 |
| 5,012,137 | 4/1991 | Siddiq et al. | 360/128 |

FOREIGN PATENT DOCUMENTS

| | | | |
|---|---|---|---|
| 0122724 | 10/1984 | European Pat. Off. | 360/137 |
| 0 315 624 A2 | 5/1989 | European Pat. Off. | |
| 58-19776 | 2/1983 | Japan | 360/128 |
| 61-115217 | 6/1986 | Japan | 360/128 |
| 61-192017 | 8/1986 | Japan | 360/128 |
| WO 91/02350 | 2/1991 | WIPO | |

*Primary Examiner*—Craig A. Renner
*Assistant Examiner*—David D. Davis
*Attorney, Agent, or Firm*—Charles D. Levine

[57] ABSTRACT

A cassette having a leader and recordable tape which cleans the various components of the tape path in videocassette recorders by dry scrubbing. Interactive diagnostic and instructional material is recorded on the tape to instruct the operator about the cleaning operation to enable the operator to evaluate progress of the head cleaning operation, and to program the maintenance protocol of head cleaning cycles relative to capstan cleaning cycles.

19 Claims, 3 Drawing Sheets

TAPE CASSETTE FOR CLEANING VCR HEADS AND TRANSPORT COMPONENTS

This is a continuation of application Ser. No. 08/035,744 filed Mar. 23, 1993 abandoned.

TECHNICAL FIELD

The present invention relates to cleaning cassettes for cleaning the heads of videocassette recorders. More particularly, the present invention relates to cleaning cassettes for cleaning the heads of videocassette recorders without using a liquid.

BACKGROUND OF THE INVENTION

In magnetic recording, the recording medium, such as magnetic tape, must be maintained in intimate contact with the surface of the transducer, or "head," during the recording and playback processes. Even the smallest contaminants, such as airborne dust or smoke particles, can be of sufficient size to affect the head-to-tape spacing and to affect noticeably the overall quality of the recording and playback process, if the contaminants find their way into the region between the head and the tape. In addition, traces of the recording medium itself can adhere to the head, thereby building up a contaminant layer of sufficient thickness to cause noticeable deterioration of signal quality. Problems of contamination are especially acute in rotary head apparatus, such as videocassette recorders and camcorders. There is a need for systems to clean the head.

There are several types of known head cleaners, including those which apply solvents by various ribbons or pads, and those which use dry scrubbing materials, carried, for example, on a magnetic recording tape. The term "dry scrubbing" refers to mechanical separation of contaminants from a surface by the action of a rough surface, called the scrubbing surface, sliding in contact with the surface to be cleaned. Roughness of the scrubbing surface can be produced by such methods as attaching particulates to a substrate, providing a fabric layer as the scrubbing surface, or by mechanically embossing a pattern into the scrubbing surface. While abrasive surfaces provide dry scrubbing, it is not necessarily desirable that the dry scrubbing surface be abrasive, because an overly abrasive surface could accelerate wear of the surfaces being cleaned.

Despite the risk of accelerated wear, dry scrubbing materials which accomplish the cleaning operation without solvents have the advantage of greater safety than those which use solvents, since the use of solvents in a household environment, especially where children are present, can involve problems of toxicity, spilling, and irritating vapors.

The risk of accelerated wear due to the use of dry scrubbing materials can be reduced by limiting the abrasiveness of the dry scrubbing material itself. In U.S. Pat. No. 5,012,377, a head cleaning material which is only "mildly abrasive" is disclosed. The cleaning operation is aided by grooves in the surface of the cleaning material, which capture the contaminants removed by the abrasive material and carry them away. Presumably, the grooves may help to reduce head wear during cleaning by allowing the head to be cleaned in a shorter time, thereby limiting the exposure to abrasive materials during cleaning of the head.

Adhesives have also been used as an aid to abrasive cleaning of heads. U.S. Pat. No. 4,408,241 uses a layer having a low level of adhesion, along with a mesh layer. The mesh layer detaches contaminants from the head surface, and the adhesive layer captures them.

A second approach to reduce the risk of head abrasion during cleaning is to limit the exposure of the head to the cleaning material by providing some method for monitoring the progress of the cleaning operation while it is being performed, so that the process can be stopped when an adequate level of cleanliness has been reached. This not only reduces the risk of unnecessary head wear, but also saves the operator time by not performing the cleaning process for a longer time than is necessary. An example of this approach is U.S. Pat. No. 3,978,520, assigned to Minnesota Mining and Manufacturing Company, which achieves dry scrubbing by providing a controlled level of abrasiveness in a recordable magnetic layer. A signal which is sensitive to the cleanliness of the head is prerecorded onto the cleaning tape, so that when a video head, for example, is being cleaned, the operator can monitor the progress of the cleaning by watching the picture displayed by the video apparatus. Once the displayed picture reaches a level of quality corresponding to a clean head, the tape can be stopped and removed from the apparatus. During the cleaning operation, before the head has reached the requisite state of cleanliness, the scrubbing material contacts primarily the contaminant layer, and not the surface of the head itself.

Devices which use parameters other than the quality of the picture seen by the operator as a measure of head cleanliness also are known. U.S. Pat. No. 4,607,297 discloses a rotary head tape recording/playback apparatus having circuitry which enables head clogs to be detected. Likewise, EP 315624 discloses a system involving a tape cassette having a cleaning section, in which the dropout error rate is detected and used as a signal to initiate a cleaning step. However, these systems suffer from the imitation that they are built into the playing/recording apparatus itself, and cannot be used with an existing playing/recording apparatus not equipped with such circuitry.

A recordable head cleaning material for a computer diskette is disclosed in U.S. Pat. No. 4,516,176. Programming instructions are recorded on a diskette to enable the disk drive to perform a cleaning cycle automatically, with minimal involvement from the operator. The cleaning time is preset by programming, and there is no provision for adjusting the cleaning time based upon the cleanliness of the head.

A system for monitoring the progress of a head cleaning process in a floppy disk drive is disclosed in WO 91/02350. A cleaning step and a signal measurement level step are alternated, and comparisons are made between the signal level before the cleaning step and the signal level after the cleaning step. If the cleaning step has produced an improvement, another cleaning step is performed. This cycle is repeated until no further improvement is noted.

A cleaning tape which includes cleaning and polishing segments spliced onto prerecorded diagnostic and instructional segments is disclosed in U.S. Pat. Nos. 4,893,209 and 4,928,189. The disclosed tape does not, however, involve any interaction between the operator and the apparatus during the cleaning process, since there is no provision for monitoring the progress of the head cleaning process, or for the cleaning step to be terminated when the head is clean, since the cleaning portion of the tape is not recordable.

A diagnostic and instructional tape which enables the user to evaluate and adjust electronic functions of a video system, based upon prerecorded test patterns, is disclosed in U.S. Pat. No. 4,724,484. The test patterns disclosed are of the type commonly generated by test pattern generators used by technicians in performing electronic adjustments. While this patent suggests a variety of electronic parameters which might be adjusted or corrected, it does not mention any head cleaning operation, or using any of the test patterns as an indicator of head cleanliness.

While the head is the element of primary concern when considering the cleanliness of a tape recording system, there is also a need to consider other components which contact the tape, since it would be of little benefit to clean the head if contaminants from other parts of the system, such as the capstan and pressure roller (also called a pinch roller), were to be transported to the head region by the tape. In particular, the capstan and tape guides which control the transport of the tape past the head are known to collect contaminants.

U.S. Pat. No. 4,616,283 discloses a cassette having a tape, or "ribbon," as it is called in this patent, for cleaning the head, as well as a pad for cleaning the capstan and pinch roller in a video player/recorder. This patent also discloses a mechanically-operated shutter located in the optical path of the end-of-tape detection system for signalling the player/recorder to continue rotation of the capstan and pinch roller during cleaning. An improved version of this cleaning cassette is disclosed in U.S. Pat. No. 4,941,065. These systems can only clean the capstan if it is located at the backside of the tape.

A limitation of cleaning cassettes which depend upon mechanical brushing or wiping devices is that the design of the recording apparatus can vary widely from one manufacturer to another, and no single known cleaning cassette design can be used for all such apparatus. For example, the cleaning cassettes of U.S. Pat. Nos. 4,616,283 and 4,941,065 cannot clean the capstan if it is located on the front side of the tape. There is a need for a cleaning cassette which can be used with a variety of different apparatus, in particular a variety of different makes and models of videocassette recorders, and which is capable of cleaning not only the head, but also other components of the apparatus which contact the tape.

SUMMARY OF THE INVENTION

The present invention meets these needs and includes a cassette containing a dry scrubbing tape for cleaning the head, capstan, and tape guides in a rotary head magnetic tape recording apparatus, such as a videocassette recorder or camcorder (collectively referred to as a VCR). The tape includes a magnetically recordable dry scrubbing front side for cleaning the rotary head, a dry scrubbing backside for cleaning guides in the tape path, and dry scrubbing leader portion for cleaning the drive capstan of the recording apparatus.

The dry scrubbing leader portion can be wider than the standard tape to clean the areas of the capstan which are adjacent to the edges of the tape in addition to the areas which contact the tape. To accommodate capstans which may contact either side of the tape, the leaders have dry scrubbing surfaces on both sides.

Incorporating a light colored pigment, such as titanium dioxide, into the backside layer of the tape serves to make visible any contaminant collected by the backside surface.

Interactive diagnostic and instructional material is recorded on the recordable dry scrubbing front side of the tape to enable the operator to monitor the progress of head cleaning as it occurs, to explain to the operator the important aspects of the cleaning process, and to instruct the operator about the process steps to be taken in cleaning the various components of the apparatus, including the capstan, as the process is performed. An additional function of the recorded material is to program into the tape the maintenance protocol of number of head cleaning cycles relative to the number of capstan cleaning cycles to be performed. The magnetic material on the front side of the tape portion is prerecorded with audio sounds and video images which, when the cleaning cassette is inserted into the VCR, convey a diagnostic video image in which the image quality is a measure of the head cleanliness. The instructions and the diagnostic video image can combine to provide a maintenance protocol.

DETAILED DESCRIPTION OF PREFERRED EMBODIMENTS

Figure 1:
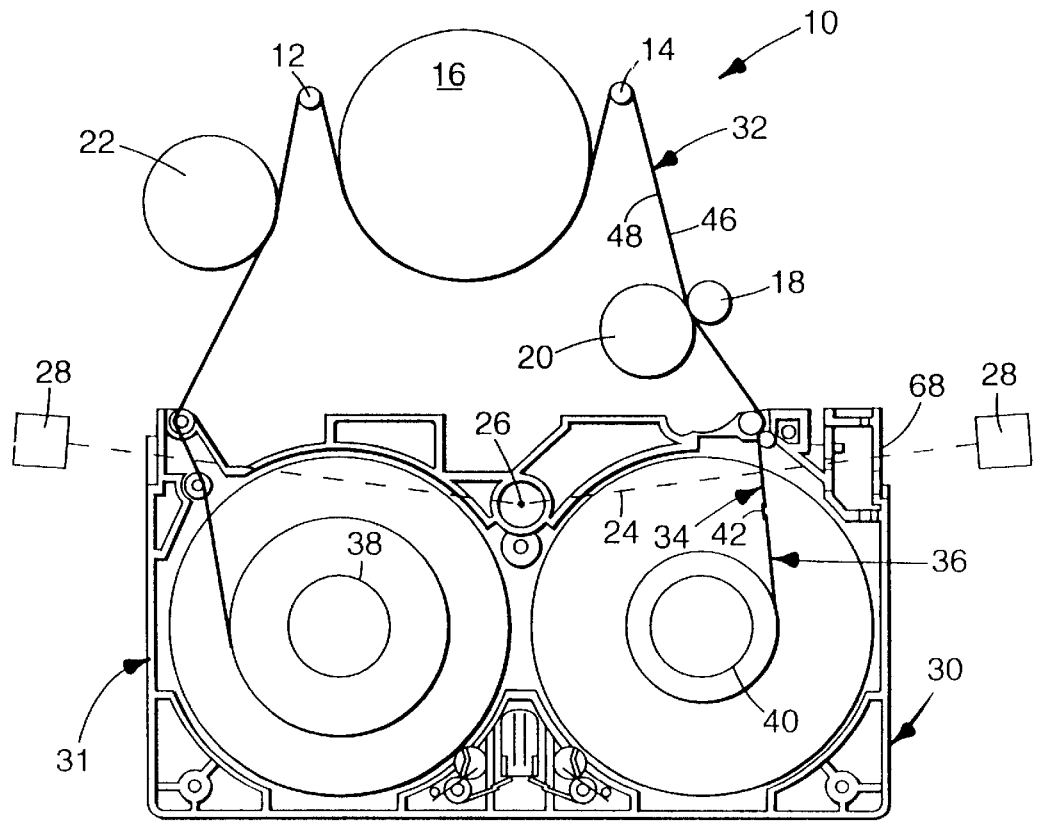
FIG. 1 is a schematic view of the tape-contacting components in the tape path of a typical VHS VCR.

FIG. 1 shows a cleaning cassette 30 of the present invention. The cassette 30 has a housing 31 and includes a cleaning tape 32 which is inserted into a recording/playing apparatus. The recording/playing apparatus can be a videocassette recorder (VCR) or a camcorder having various formats, but will be referred to generically as a VCR 10. A loop of tape 32 is pulled from the cassette 30 by guides, such as pins 12, 14, and is held in contact with a rotary head 16 during recording or playing. The VCR 10 is then operated in various modes, as indicated by instructions recorded at appropriate locations on the tape 32, to transport the tape 32 over the various contacting components of the VCR 10 to clean them by scrubbing contact. The tape passes between a capstan 18 and a pressure roller 20 before it reaches the head 16. Additional rollers, such as an idler roller 22, and pins guide the tape. The tape cleans the various components including the capstan 18, the various rollers and pins, and the head 16. The tape cleans both the video head as well as the audio head. The head 16 refers to all of the heads, whether video, audio, erase, or otherwise, regardless of the type of head and whether a plurality of heads are included on a single drum or head assembly.

Figure 2:
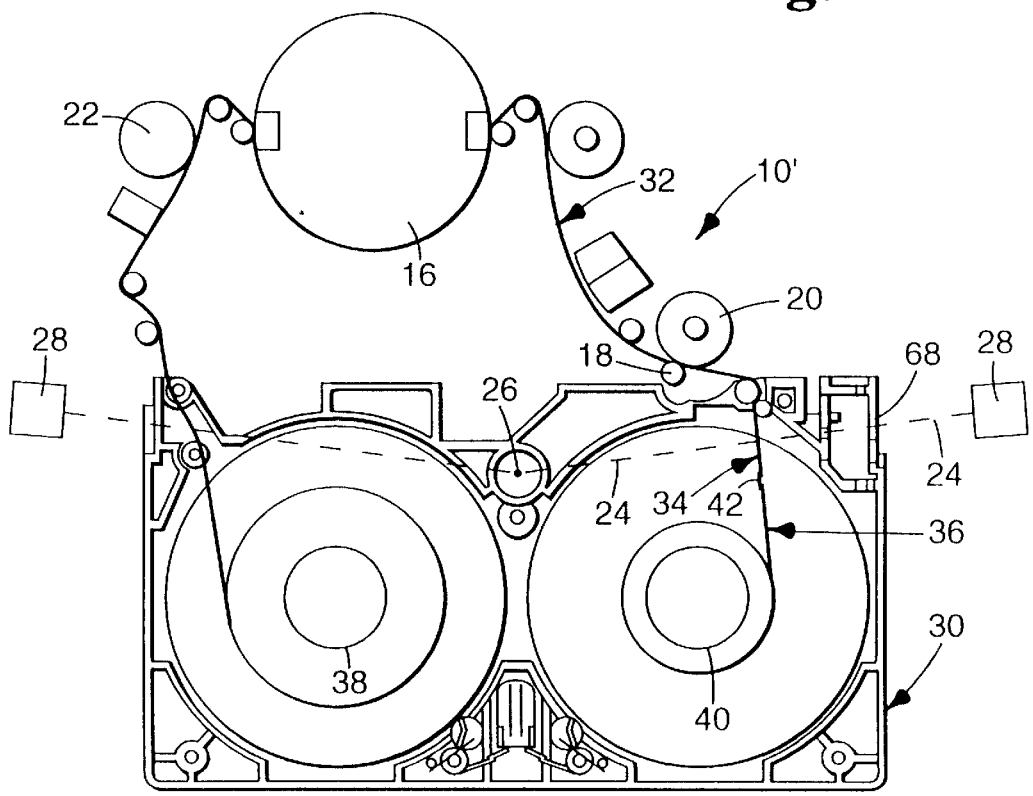
FIG. 2 is a more detailed schematic view of an alternative model of a VHS VCR.

A great variety of VCR's exist, and some tape contacting components may be present on some apparatus but not on others. FIG. 2 shows a VHS VCR 10' which contacts the tape with several additional guides, such as pins, and stationary magnetic heads. In comparing FIGS. 1 and 2, the capstan 18 and pressure roller 20 are in different locations relative to the cassette 30. The capstan 18 contacts the opposite side of the tape 32 in the two figures. Because the cleaning function of the present invention is performed entirely by tape, these variations in apparatus configuration can be readily accommodated without the need to modify the cassette 30 to suit particular apparatus designs. This is a vast improvement over the known cleaning cassettes.

Figure 3:
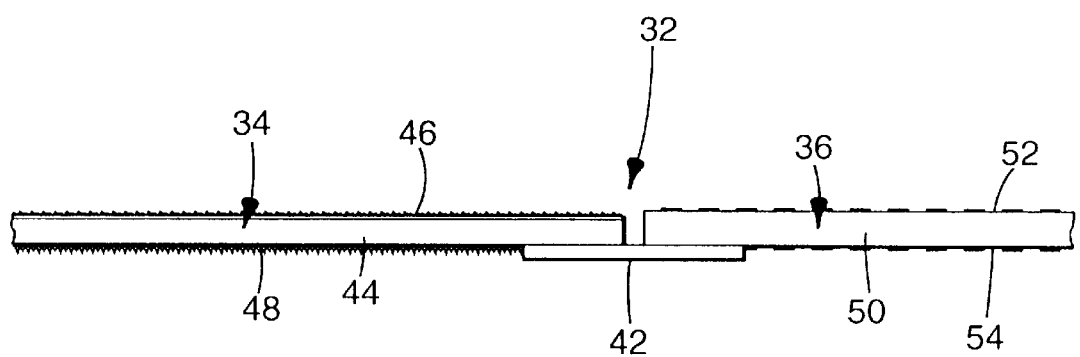
FIG. 3 is a side view of a cleaning tape and leader according to the present invention.

The cleaning tape 32 of the present invention, as shown in FIG. 3, includes a recordable tape portion 34 and a leader portion 36. The tape portion 34 is connected to a supply reel 38 by a trailer portion (not shown) and the leader portion 36 is connected to a takeup reel 40 in the cassette 30. The tape portion 34 is attached to the leader portion 36 by, for example, adhesive tape 42, in the manner commonly used in commercially available VHS cassette tapes. Alternatively, other methods can be used to attach the tape portion 34 to the leader portion 36.

The tape portion 34 includes a substrate layer 44, which is covered by a magnetically recordable dry scrubbing layer 46 on a front side, and a dry scrubbing layer 48 on a backside. The scrubbing layers 46, 48 differ from each other in that the layer 46 includes magnetic particles for recording and is smoother. A suitable formulation and method of application for the layer 46 is disclosed in U.S. Pat. No. 3,978,520, assigned to Minnesota Mining and Manufacturing Company.

A backside dry scrubbing layer 48 which is suitable for the present invention includes a titanium dioxide pigment dispersed in a polymeric binder. The binder, such as polymeric material with urethanes, is suitable for backside coatings for magnetic recording tapes. Titanium dioxide pigments commonly used in paints and inks have a suitable particle size and shape for use as scrubbing material in the scrubbing layer 48. Also, suitable methods of forming coatable dispersions of these pigments in polymeric binders are known. It is desired to include a sufficient amount of titanium dioxide pigment in the binder for the layer 48 to give the layer 48 a light color to make visible any collected contaminants, as long as the pigment loading does not impair the ability of the binder to hold the pigment securely in the layer 48.

The leader portion 36 includes a film substrate 50, which is covered on a front side by a microabrasive dry scrubbing layer 52, and on a backside by a microabrasive dry scrubbing layer 54. The scrubbing layers 52, 54 can be the same or can differ. A suitable method for forming the dry scrubbing layers 52, 54 is disclosed in U.S. Pat. No. 4,773,920, which uses a curable dispersion of abrasive particles in a binder. It is preferred that the particles used be of varying sizes including approximately 5 microns in diameter, and that the particulate material be either aluminum oxide or silicon carbide. While both sides of the substrate 50 can be coated with the abrasive dispersion to accommodate a variety of capstan configurations, for any given apparatus, only one side of the leader portion 36 will be used in performing the capstan cleaning function.

Figure 4:
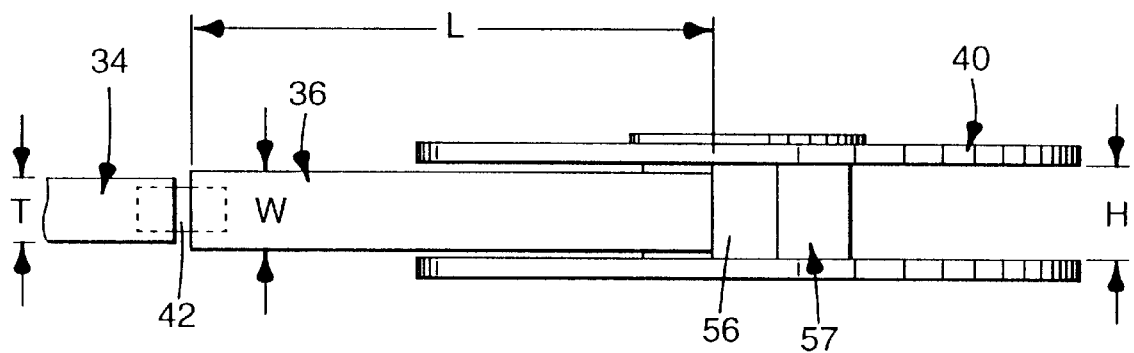
FIG. 4 is a plan view of the tape and leader of the present invention attached to the takeup reel of a videocassette.

As shown in FIG. 4, it is preferred that the width W of the leader portion 36 be slightly greater than the width of standard recording tapes normally used in the particular apparatus being cleaned. In the case of VHS VCR's, the standard width for recording tape is 12.65 mm ±0.01 mm (0.498 inches ±0.0004 inches). It has been found that a suitable width W for the leader portion 36 is 12.9 mm (0.508 inches). If the path of the wider leader portion 36 is centered on the path of the tape used in recording, a region extending beyond each edge of the tape path for a distance of 0.125 mm (0.005 inches) will be cleaned. The specific width W is not critical, provided it is greater than the width of standard recording tape used in the apparatus being cleaned, but less than the width H of the hub 57, so that the leader portion 36 can fit between the hub flanges without interference.

Figure 5:
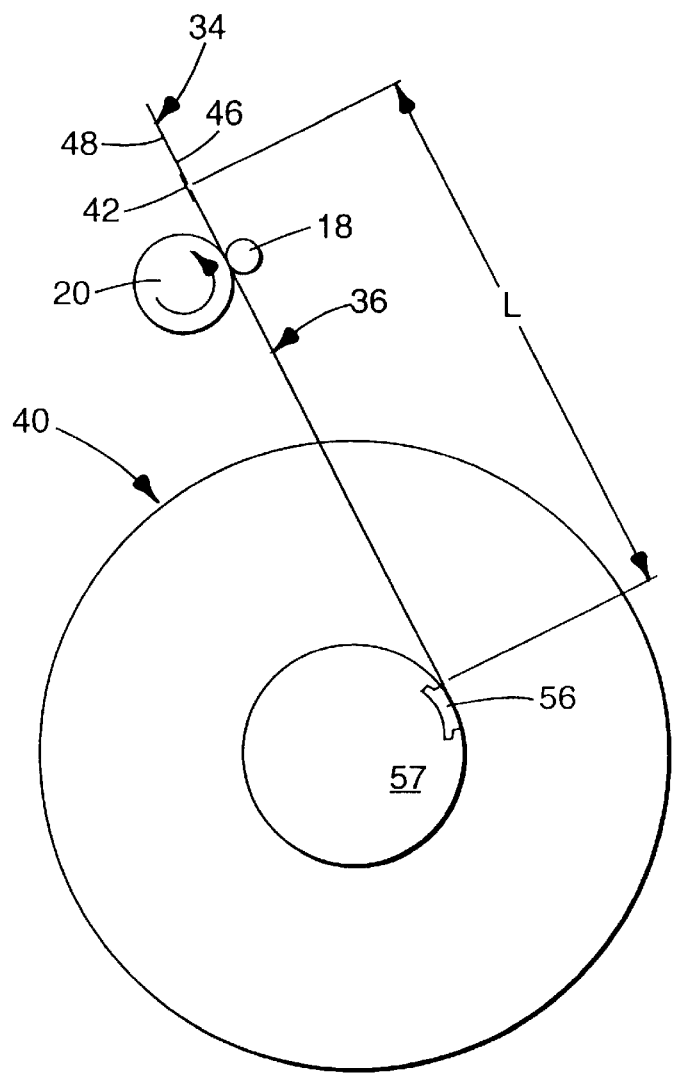
FIG. 5 is a top view of the cleaning leader during the process of cleaning the capstan.

It is important that the length L of the leader portion 36, as shown in FIG. 5, be of sufficient length to reach the capstan 18 and the pressure roller 20, but not so long as to reach the rotary head 16, since the scrubbing layers 52, 54 may damage the head 16 if either contacts it. It is further desirable that the leader portion 36 be attached to the takeup reel 40 with a clamp 56 and that the clamp 56 be able to sustain a higher tape tension than the adhesive tape 42 coupling, so that any excessive tension applied to tape portion 34 will result in a break at the splice, not at clamp 56, to preclude dragging the splice through the region of the head 16. Also, the leader portion 36 should not stretch enough to permit the scrubbing layers 52, 54 of the leader portion 36 to contact the head 16.

The tape 32 is wound onto the supply reel 38 in a manner similar to the winding of a standard recording tape, with the leader portion 36 clamped onto the hub 57 of the takeup reel 40 by a clamp 56. The resulting cleaning cassette 30 is thus identical in its essential features (except for the defeated light sensor) from a standard recording/playing cassette, such as a VHS videocassette.

Figure 6:
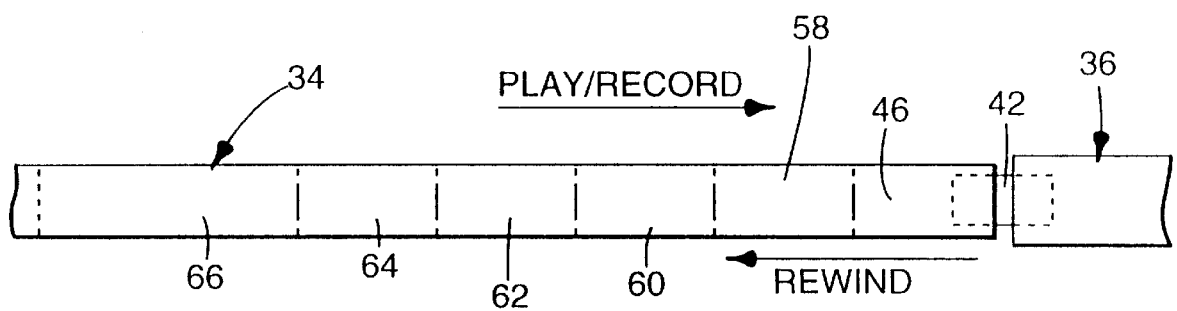
FIG. 6 is a plan view of the tape and leader portions showing the location of recorded material on the cleaning tape according to the present invention.

An additional feature of the present invention, as shown in FIG. 6, is the recording of information onto the magnetic layer 46 of the tape portion 34 to enable the operator to perform the cleaning process by responding to the instructions and diagnostic information contained therein. The recorded information is of three kinds: (a) a diagnostic image for evaluating audio and video head cleanliness and verifying audio and video performance; (b) audio and video signals and messages indicating that the cleaning process is occurring, and describing the operations being performed during the cleaning process; and (c) instructions to the operator for placing the apparatus in particular modes of operation at particular stages of the cleaning process, to clean the head, the tape guides, and the capstan. Additionally or alternatively, the recorded information could include further support information such as telephone numbers or addresses, from which help could be obtained, or advertisements.

It has been found beneficial, in rotary head apparatus, to clean the rotary head more frequently than other, less contamination-sensitive components, such as the capstan. The present invention uses the recordability of the layer 46 to provide an audio and video message that determines the suitable frequency of head cleaning relative to the frequency of capstan cleaning.

The tape portion 34 has four head cleaning segments provided before a capstan cleaning is performed in response to a capstan cleaning segment 66. Each head cleaning segment 58, 60, 62, 64 is defined by material recorded on layer 46. This material is repeated serially. The recorded material includes diagnostic imagery which is sensitive to head cleanliness, instructions for performing the head cleaning operation, and other explanatory material. More specifically, the following recorded material has been found suitable:

(a) an audio signal (such as verbal instructions) indicating that the heads (both audio and video) are being cleaned; this is especially useful when the video head is so badly contaminated that no video signal is discernible;

(b) a diagnostic video image in which image quality is a measure of head cleanliness; a suitable image is the printed message "WHEN YOU CAN READ THIS MESSAGE, THE HEADS ARE CLEAN";

(c) explanatory information showing the operation of a rotary head apparatus, and the parts being cleaned; and (d) instructions for completing the head cleaning operation, and removing the cassette from the apparatus; in the present embodiment, these instructions include, for segments 58, 60, 62, a message telling the operator to stop the cassette without rewinding to maintain the desired relative component cleaning frequencies; rewinding after using the segment 58 for head cleaning would result in reuse of this segment, whereas the intent is to use the segment 60 for the next head cleaning. Repeated use of the cassette, without rewinding, will eventually result in the segment 64 being used to clean the head. The segment 64 includes the last repetition of the recorded material. The segment 64 differs from the segments 58, 60, 62 in that it leads directly into the segment 66, which carries instructions for performing a capstan cleaning using the leader portion 36. The segment 66, unlike the segments 58, 60, and 62, does not instruct the user to stop and remove the cleaning cassette 30. The segment 66 instructs the user to place the apparatus in the "rewind scan," sometimes called the "reverse search," mode, in which the tape is played backwards at many times the normal playing speed in the case of VHS VCR's. This results in the familiar fast motion backwards playing of the tape. During this mode, the leader portion 36 will clean the capstan 18 and the backside will also perform additional cleaning on the pins.

In a standard VHS cassette, the backward search mode is stopped when the transparent tape leader portion crosses the optical path of the end-of-tape detector. Referring to FIG. 1, the tape 32 is wound onto the supply reel 38 until the transparent leader portion 36 crosses the light beam 24, generated by the light source 26, thereby allowing light to activate the detector 28, which stops the reverse scanning. In the present invention, however, the light beam 24 is blocked by, for example, closing an aperture 68. As a result, the situation shown in FIG. 5 occurs, in which the capstan 18 continues to drive the leader portion 36 until it pulls against the clamp 56. At this point, the capstan 18 spins against the stationary dry scrubbing surface of the leader portion 36, thereby scrubbing itself clean. Other methods of blocking the light beam 24, such as making the leader portion 36 opaque, rather than transparent, also could be used. The operator is then instructed to stop the reverse scan, or alternatively, depending upon the particular model of machine being cleaned, stop and eject the cassette. Many VCR's will sense the lack of tape movement and will shut down automatically. The tape portion 34 does not clean the capstan 18 because the tape portion 34 does not slip across the capstan 18 sufficiently to clean. The tape portion 34 is always in rolling contact with the capstan 18.

There are no separate pads or brushes required to clean all of the guides and other components. All of the cleaning described above is accomplished by the tape 32. Additionally, the magnetic recording is on the same portion of tape as the cleaning material. There are not separate magnetic recording portions and head cleaning portions of the tape.

We claim:

1. A VCR component cleaning cassette for cleaning at least VCR heads and tape guides comprising:

a videocassette housing having an opening through which tape is pulled during a play mode;

a supply reel mounted in the housing;

a takeup reel mounted in the housing;

a length of tape mounted between the supply reel and the takeup reel, wherein the tape comprises a tape portion, a leader portion, and means for connecting the tape portion to the leader portion, wherein the tape portion has a front side comprising a recordable front side scrubbing material suitable for cleaning the heads and a backside comprising a backside scrubbing material suitable for cleaning the tape guides, wherein the front side scrubbing material differs from the backside scrubbing material, and wherein the leader portion cleans the capstan; wherein the leader portion comprises scrubbing material on at least one of the front side of the tape and the backside of the tape for cleaning the capstan, and wherein the scrubbing material on the tape portion differs from the scrubbing material on the leader portion, and wherein when the cleaning cassette is inserted into the VCR the tape is capable of cleaning the heads, tape guides, and capstan with only the front side of the tape portion contacting the heads, regardless of the internal configuration of these components in the VCR.

2. The cleaning cassette of claim 1 wherein the connecting means comprises adhesive tape.

3. The cleaning cassette of claim 1 wherein the length of the leader portion is selected to be greater than the distance from the takeup reel to the capstan to permit the leader portion to contact and clean the capstan.

4. The cleaning cassette of claim 3 wherein the length of the leader portion is selected to be less than the distance from the takeup reel to the heads to prevent contact between the leader portion and the heads.

5. The cleaning cassette of claim 1 further comprising a clamp which secures the end of the leader portion to the takeup reel, wherein the clamp has a higher tape tension threshold than the connecting means to cause any excessive tension that is applied to the tape to break the tape at the connecting means to prevent the leader portion from being dragged intact across the heads.

6. The cleaning cassette of claim 1 wherein the leader portion is sufficiently wider than the tape portion to clean an area of the capstan that extends beyond each edge of the tape portion without significantly increasing the tape tension threshold of the clamp.

7. The cleaning cassette of claim 1 further comprising means for disabling an end-of-tape detector in the VCR to cause the capstan to continue to rotate against the leader portion which is stationary after the leader portion is completely unwound, thereby to rotate the capstan against the scrubbing material on the leader portion to clean the capstan.

8. The cleaning cassette of claim 7 wherein the capstan is cleaned by operating the cleaning cassette in a reverse mode.

9. The cleaning cassette of claim 1 wherein the heads are cleaned by operating the cleaning cassette in a play mode.

10. The cleaning cassette of claim 1 wherein the magnetic material on the front side of the tape portion is prerecorded with audio sounds and video images which, when the cleaning cassette is inserted into the VCR, convey instructions to an operator for using the cleaning cassette, and wherein a first set of instructions is repeated serially in segments and after the last repeated segment having a first set of instructions a second set of instructions is conveyed.

11. The cleaning cassette of claim 10 wherein the second set of instructions directs the cleaning of the capstan.

12. The cleaning cassette of claim 10 wherein the first set of instructions is repeated serially without any intervening segments.

13. The cleaning cassette of claim 1 further comprising a light colored pigment incorporated into the backside layer of the tape to make visible any contaminant collected by the backside surface.

14. The cleaning cassette of claim 13 wherein the pigment comprises titanium dioxide.

15. The cleaning cassette of claim 1 wherein the degree of abrasiveness of the scrubbing material on the tape portion is less than the degree of abrasiveness of the scrubbing material on the leader portion.

16. The cleaning cassette of claim 1 wherein the scrubbing material on the front side of the tape portion, the scrubbing material on the back side of the tape portion, and the scrubbing material on the leader portion comprises different abrasives.

17. A method of cleaning VCR heads and tape guides regardless of the internal configuration of these components in the VCR comprising:

running a length of tape, which has a front side comprising a recordable front side scrubbing material suitable for cleaning the heads and magnetic material and a backside comprising a backside scrubbing material suitable for cleaning the tape guides wherein the scrubbing material on the front side of the tape differs from the scrubbing material on the back side of the tape, through the VCR to clean the heads and tape guides and simultaneously to play audio sounds and video images.

18. The method of claim 17 further comprising causing the capstan to continue to rotate against the tape which is stationary after the tape is completely unwound, thereby to rotate the capstan against the tape to clean the capstan.

19. The method of claim 18 wherein the audio sounds and video images convey at least one of instructions to an operator for using the cleaning cassette, a diagnostic video image in which the image quality is a measure of the head cleanliness, and information about the function of the cleaning cassette.

* * * * *